United States Patent
Hrdina et al.

(10) Patent No.: US 6,988,378 B1
(45) Date of Patent: Jan. 24, 2006

(54) LIGHT WEIGHT POROUS STRUCTURE

(75) Inventors: Kenneth E. Hrdina, Horseheads, NY (US); John E. Maxon, Canton, NY (US); Michael H. Wasilewski, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/626,634

(22) Filed: Jul. 27, 2000

(51) Int. Cl.
C03B 19/06 (2006.01)

(52) U.S. Cl. .............................. 65/17.4; 65/17.5; 65/22; 65/413; 65/414; 65/415; 65/423; 264/413; 264/414

(58) Field of Classification Search .................. 65/17.4, 65/17.5, 22, 413, 414, 415, 423; 264/51, 264/413, 414
See application file for complete search history.

(56) References Cited

U.S. PATENT DOCUMENTS

| | | | |
|---|---|---|---|
| 2,123,536 A | * | 7/1938 | Long |
| 3,923,484 A | | 12/1975 | Randall ........................ 65/18 |
| 4,381,931 A | * | 5/1983 | Hunold et al. ............... 65/17.5 |
| 5,043,002 A | | 8/1991 | Dobbins et al. |
| 5,154,744 A | | 10/1992 | Blackwell et al. ........... 65/3.12 |
| 5,228,243 A | | 7/1993 | Noll et al. ..................... 51/216 |
| 5,316,564 A | | 5/1994 | Nakamura et al. |
| 5,576,884 A | | 11/1996 | Ise et al. |
| 5,698,484 A | | 12/1997 | Maxton ....................... 501/54 |
| 5,922,100 A | | 7/1999 | Cain et al. .................... 65/531 |

FOREIGN PATENT DOCUMENTS

WO 99/15468 4/1999

* cited by examiner

Primary Examiner—Michael Colaianni
(74) Attorney, Agent, or Firm—Timothy M. Schaeber; Patrick Pacella

(57) ABSTRACT

These glass bodies are light weight porous structures such as a boules of high purity fused silica (HPFS). More specifically, the porous structures are supports for HPFS mirror blanks. Porous glass is made utilizing flame deposition of pure silica or doped silica in a manner similar to the production of high purity fused silica. Bubbles or seeds are formed in the glass during laydown. Finely divided silicon carbide (SiC) particles are used to form the bubbles. At least one layer of porous glass is formed in the boule.

10 Claims, 4 Drawing Sheets

Cross section of fused silica boule showing layers of bubbles formed by adding SiC particles during lay-down. (Thick layer of bubbles at bottom of boule is a layer formed by the bait sand.)

15 cm

FIG. 1 Cross section of fused silica boule showing layers of bubbles formed by adding SiC particles during lay-down. (Thick layer of bubbles at bottom of boule is a layer formed by the bait sand.)
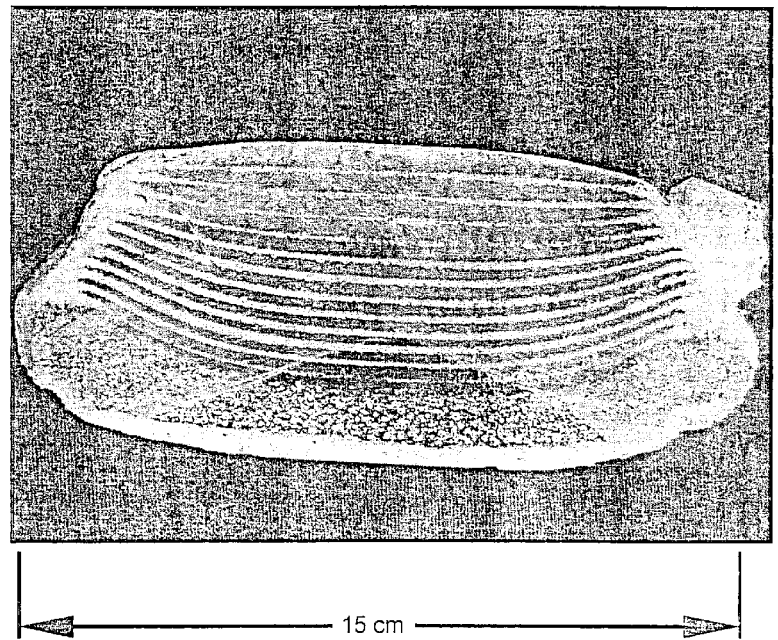

FIG. 2 Seed layers formed with Buehler 220 grit SiC grinding media.
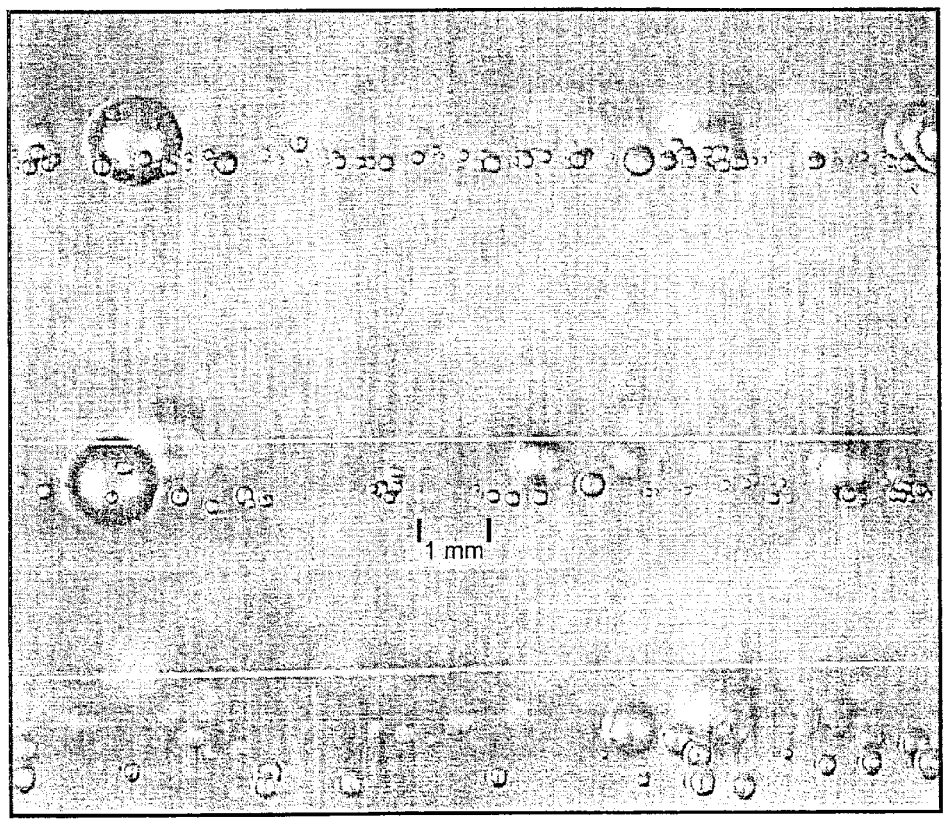

FIG. 3 Seed layers formed with Grade 400 SiC particles.
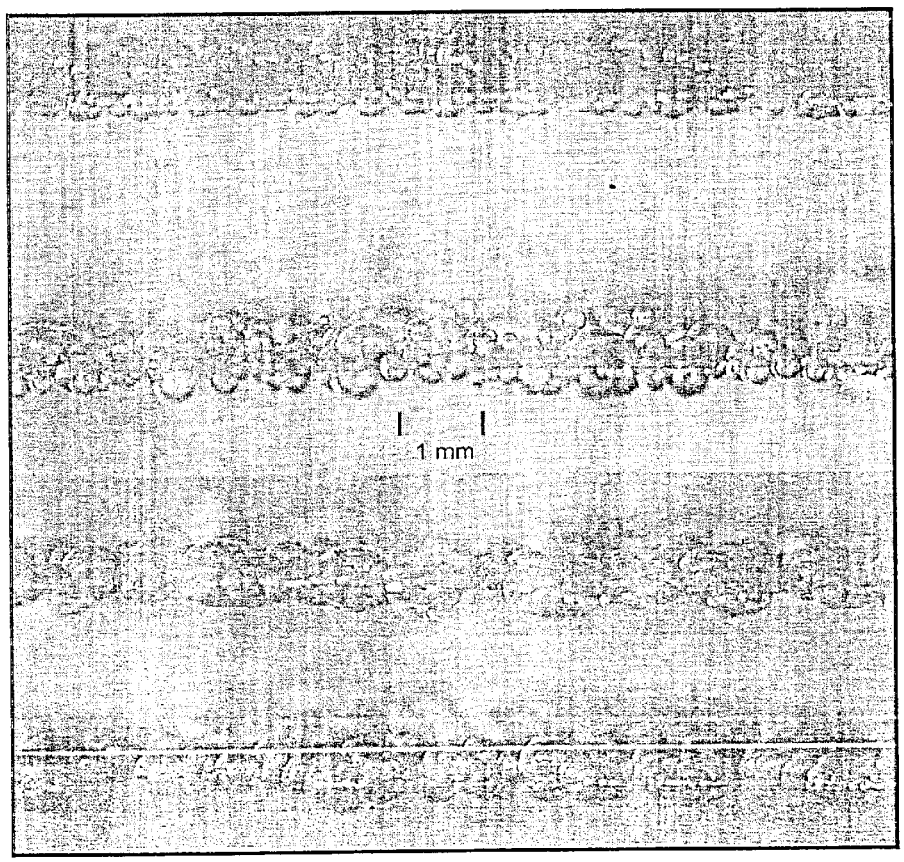

FIG. 4  Seed layers formed with Grade 1200 SiC particles.
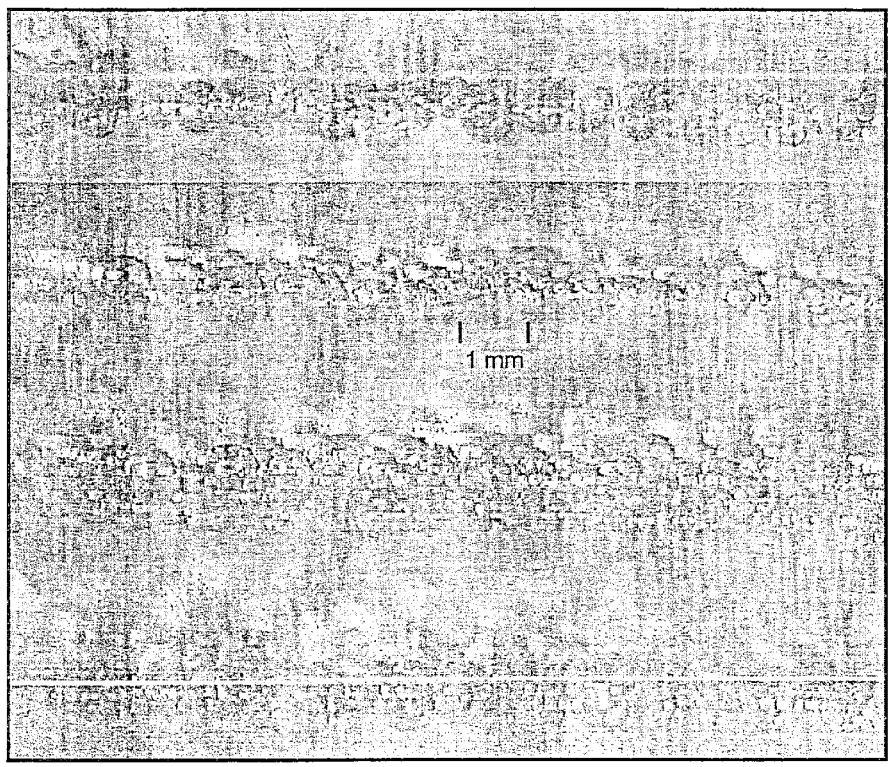

LIGHT WEIGHT POROUS STRUCTURE

TECHNICAL FIELD

This invention relates to light weight porous structures for glass bodies such as a boule of high purity fused silica HPFS® fused silica glass of Corning Incorporated, Corning, N.Y. 14830 made via a flame hydrolysis process. More specifically, the porous structures are useful as high temperature light weight low loss dielectric material.

BACKGROUND OF THE INVENTION

Industry has identified two end uses for these products. The first is a high temperature light weight low loss dielectric material. High purity fused silica is a high temperature low loss dielectric material, but in and by itself is heavy. A scalable process for making HPFS® high purity fused silica glass porous would be highly desirable.

Regarding the second use, reducing the weight of mirror supports is vital for the future of the mirrors business. Two separate categories of light weighted mirrors are desired. First, they are vital for the space program which has stringent weight constraints. Second, large scale terrestrial bound mirrors (over a meter in size) also desire light weight supports in order to have better control over the maneuverability of the mirrors while in use. The mirror supports should not add any stresses to the actual mirror. One of the best ways of doing this is to make the mirror support out of the same material as the mirrors so that no stresses from thermal expansion mismatch develop.

Currently, mirrors are made of either high purity fused silica HPFS® fused silica glass or ULE® ultra-low expansion glass of Corning Incorporated, Corning, N.Y. 14830. An additional requirement is that the mirror material must also be environmentally stable.

The existing method for making supports first involves making dense glass. Secondly, the glass is machined into an intricate honeycomb-like pattern to remove most excess weight. Thirdly, the mirror is bonded to the fabricated honeycomb structure. A process for making porous glass without first making dense glass would be highly desirable.

BRIEF SUMMARY OF THE INVENTION

The processes in this invention describe methods, using flame hydrolysis and silicon carbide (SiC) particles for making porous light weight glass which can be used for either application. Industry also may use the methods on applications not yet identified, but which require porosity in these high purity, high temperature glass structures. The composition of the glass can be controlled. Even though HPFS and ULE compositions were the focus of the invention, the method is not restricted to these compositions. The process in this invention allows for the fabrication of controlled layered structures such that pore free glass can be made directly on top of the porous structure. The thickness of the layers and number of the layers are controlled in this process.

Porous glass is made utilizing flame deposition of pure silica or doped silica in a manner similar to the production of high purity fused silica. Bubbles or seeds are formed in the glass during laydown. Bubbles or "seeds" are formed in the glass during laydown by the introduction of commercially available silicon carbide particles. This process requires a minimum of alterations to the current glass making furnace and process, allowing the same equipment currently used for the production of dense glass to be used for the production of porous glass. These particles may be introduced either through the fume stream of the current laydown burner or through a separate delivery system installed on the crown, which will uniformly deliver a controlled stream of particles onto the boule surface through the crown during the laydown process. Monitoring the particle size and flow rate can control the seed size and concentration in the glass.

Glass properties will change, depending on the amount of SiC that does not fully react. However, these properties changes are expected to be smaller for two reasons. First, one of the products of the SiC reaction is the formation of $SiO_2$, the base glass. Secondly, the quantity of SiC needed to form an appreciable amount of pores is relatively small. Typically, this amount is less than 1% by weight. As a result, little SiC is expected to be present in the final porous structure.

BRIEF DESCRIPTION OF THE DRAWINGS

FIG. 1 shows a cross-section of a fused silica boule according to this invention.

FIG. 2 shows seed layers from Grade 220 SiC particles.

FIG. 3 shows seed layers from Grade 400 SiC particles.

FIG. 4 shows seed layers from Grade 1200 SiC particles.

DETAILED DESCRIPTION OF THE INVENTION

The fused silicas are customarily produced by a chemical vapor deposition process. In this process, oxide precursors, usually metal chlorides in vapor form, are introduced through a burner flame to produce molten oxide particles. These molten particles are deposited on a large support member to build up a body termed a boule.

In practicing the invention, a gas stream provides the vapors of at least one material that will hydrolyze to form an oxide in the flame of a combustion burner. The vaporizable material may be any of the metal halides, metal organics, or other compounds that are suitable for the conventional flame hydrolysis process of glass production. The material may be volatilized in conventional manner such as entrainment by a carrier gas. Alternative procedures include generating vapors from a heated fluidized bed.

The gas stream then is combined with fine particles of SiC. This is done by passing the vapor-containing gas stream through a bed of the fine particulate material. The vapor entraining stream then is passed through a bed or layer of finely divided SiC.

The glass precursors of this invention may vary widely. Relatively pure metal oxides are produced by thermal decomposition of precursors and deposition of the resulting oxides. The precursor may take the form of a vapor, or may be carried by a vapor. It may be decomposition by either flame hydrolysis of pyrolysis.

One such process is production of fused silica by hydrolysis or pyrolysis of a silica precursor. Commercially, this is an application of flame hydrolysis involving forming and depositing particles of fused silica which melt to form large bodies (boules). Such boules may be used individually, may be finished and integrated together into large optical bodies, or may be cut into small pieces for finishing as lenses and the like. In this procedure, the precursor is hydrolyzed and the hydrolyzed vapor is passed into a flame to form particles of a fused silica. The particles are continuously deposited, for example, in the cup of a refractory furnace where they melt to form a solid boule.

Besides essentially pure fused silica, this invention uses a fused silica doped with 5–11% by weight titania ($TiO_2$). Originally, chlorides of silicon and titanium were employed as precursors. Recently, primarily for environmental reasons, chloride-free precursors have been proposed. Specifically, a siloxane, octamethylcyclotetrasiloxane (OMCTS), and a titanium alkoxide, titanium isopropoxide, $Ti(OPril)_4$, are commercially employed.

The precursors are separately converted to vapor form and carried to a mixing manifold by a carrier gas, such as nitrogen. The mixture passes via fume lines, into a flame where the precursors are converted into $SiO_2$—$TiO_2$ particles. These particles are collected in a refractory where they melt to form a solid boule.

The titania compounds may be selected from the group consisting of titanium isopropoxide, $Ti(OC_3H_7)_4$, titanium ethoxide, $Ti)OC_2H_5)_4$, titanium 2-ethylhexyloxide, $Ti[OCH_2(C_2H_5CHCH_4H_9]_4$, titanium cyclopenthyloxide, $Ti(OC_3H_9)_4$, and the titanium amides, $(Ti(NR_2)_4$, or a combination thereof.

A prior art furnace produces the fused silica glass. Silicon-containing gas molecules are reacted in a flame to form $SiO_2$ soot particles. These particles are deposited on the hot surface of a body where they consolidate into a very viscous fluid which is later cooled to the glassy (solid) state. In the art, glass making procedures of this type are known as vapor phase hydrolysis/oxidation processes or simply as flame hydrolysis processes. The body formed by the deposited particles is often referred to as a "boule". The term includes any silica-containing body formed by a flame hydrolysis process.

We make the porous glass of high purity fused silica. Bubbles or seeds are formed in the glass during laydown. This involves the use of a burner in which either liquid octamethyl cyclo tetra siloxane (OMCTS) or OMCTS and titanium IV tetra isopropoxide (tipox) droplets are injected into the cavity.

FIG. 1 shows a cross-section of fused silica boule showing layers of bubbles formed by adding SiC particles during laydown. The thick layer of bubbles at bottom of boule is a layer formed by the bait sand.

FIG. 2 shows seed layers formed with Buehler 220 grit SiC grinding media.

FIG. 3 shows seed layers with Grade 400 SiC particles.

FIG. 4 shows seed layers formed with Grade 1200 SiC particles.

Generally, the porous silica has a porosity ranging from 10 to 80 percent. Preferably, the porous layer has a porosity ranging from 25 to 80 percent with a multiplicity of porous layers in the glass body and more preferably 25 to 50 percent. Typically, the glass body has spherical pores ranging from 1 $\mu$m to 600 $\mu$m in the porous layer. Preferably, the spherical pores range in size from 10 $\mu$m to 400 $\mu$m and more preferably from 10 $\mu$m to 200 $\mu$m. Preferably, the glass body of this invention has a closed pore structure rather than an open pore structure.

EXAMPLE

To demonstrate this invention, an experimental run was done in a single burner fused silica laydown furnace. A standard run which produces a 6" dia.×1½" thick boule was done with the exception or the addition of SiC particles, which were "puffed" onto the surface of the hot glass during laydown. This was accomplished by using a ¼" alumina tube 6" long with a rubber squeeze bulb attached to one end. A measured amount of particles was placed in the open end of the tube which was then placed through a ½" hole in the crown. Squeezing the rubber bulb briskly blew or "puffed" the particles onto the surface of the glass. If the particles were allowed to remain on the glass surfaced exposed to the flame, they would decompose into $SiO_2$ and carbon monoxide (CO) or carbon dioxide ($CO_2$) gas. Because this was done during laydown, the particles were immediately covered with glass trapping the particles which still decomposed either completely or partially. This trapped the gas to form a bubble or "seed".

Three different sized particles were used. Sample 1 was 220 grit SiC grinding media. Sample 2 was Grade 400 (20.0$\mu$) supplied by Superior Graphite Co. Sample 3 was Grade 1200 (5.0$\mu$) supplied by Superior Graphite Co.

FIG. 1 shows the experimental results. Four applications, 0.300 gr. per application of each size were puffed onto the glass surface at 15 min. intervals forming 12 distinct layers of seeds.

FIG. 2–4 demonstrate the control of the process in controlling the ability to form seed layers. The process also controls the glass thickness by controlling the duration of time the particles are introduced into the as formed glass. FIGS. 2–4 also indicate that seed size can also be controlled by the size particle introduced.

In addition to these embodiments, persons skilled in the art can see that numerous modifications and changes may be made to the above invention without departing from the intended spirit and scope thereof.

We claim:

1. A method of making a light weight, porous, homogeneous glass body comprising the steps of:
   (a) entraining within a first gas or liquid stream at least one glass precursor, and mixtures thereof that will hydrolyze in a flame to produce the corresponding glass forming oxides in particulate form;
   (b) passing the stream into the flame of a combustion burner to form and co-depositing a homogeneous oxide mixture as a glass body; and
   (c) puffing at least one layer of finely divided silicon carbide (SiC) particles onto the formed glass body, thereby creating bubbles or seeds by decomposing the SiC into a mixture of gases.

2. A method according to claim 1 including the steps of puffing a multiplicity of layers of the SiC particles onto the formed glass body.

3. A method according to claim 1 wherein the co-depositing traps the mixture of gases, thereby creating bubbles or seeds in the glass body.

4. A method according to claim 1 wherein the glass precursor and the SiC are fed into the flame continuously.

5. A method according to claim 1 wherein the glass precursor that will hydrolyze in a flame is OMCTS or $SiCl_4$.

6. A method according to claim 1 wherein the SiC has a particle size ranging from sub-micron to 50 microns.

7. A method according to claim 1 wherein the SiC has a particle size ranging from sub-micron to 25 microns.

8. A method according to claim 1 wherein the SiC has a particle size ranging from sub-micron to 10 microns.

9. A method for making a light weight, porous, homogeneous glass body comprising the steps of:
   (a) entraining within a first gas or liquid stream at least one glass precursor, and mixtures thereof that will hydrolyze in a flame to produce the corresponding glass forming oxides in particulate form;
   (b) passing the stream through a bed or layer of finely divided silicon carbide (SiC) particles; and (c) then passing the stream into the flame of a combustion burner to form and co-deposit a homogeneous oxide mixture as a glass body, thereby creating bubbles or seeds in the glass body by decomposing the SiC into a mixture of $SiO_2$ and gases.

10. A method according to claim 9 wherein the glass precursor and the SiC are fed continuously into the flame.

* * * * *